United States Patent
Chun et al.

(10) Patent No.: US 11,206,519 B2
(45) Date of Patent: Dec. 21, 2021

(54) METHOD AND APPARATUS FOR RELAY TERMINAL TRANSMITTING AND RECEIVING SIGNAL IN D2D WIRELESS COMMUNICATION SYSTEM

(71) Applicant: LG ELECTRONICS INC., Seoul (KR)

(72) Inventors: Sungduck Chun, Seoul (KR); Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/639,548

(22) PCT Filed: Aug. 20, 2018

(86) PCT No.: PCT/KR2018/009511
§ 371 (c)(1),
(2) Date: Feb. 14, 2020

(87) PCT Pub. No.: WO2019/035698
PCT Pub. Date: Feb. 21, 2019

(65) Prior Publication Data
US 2020/0228951 A1 Jul. 16, 2020

Related U.S. Application Data

(60) Provisional application No. 62/547,114, filed on Aug. 18, 2017.

(51) Int. Cl.
*H04W 4/00* (2018.01)
*H04H 20/71* (2008.01)
(Continued)

(52) U.S. Cl.
CPC ............. *H04W 4/70* (2018.02); *H04L 5/0055* (2013.01); *H04W 4/40* (2018.02); *H04W 4/90* (2018.02); *H04W 76/30* (2018.02)

(58) Field of Classification Search
CPC ......... H04W 4/70; H04W 76/30; H04W 4/90; H04W 4/40; H04W 76/50; H04W 76/14; H04W 88/04; H04L 5/0055
(Continued)

(56) References Cited

U.S. PATENT DOCUMENTS

| 9,992,782 | B2* | 6/2018 | Kalhan | ............. H04W 72/1278 |
| 2003/0144003 | A1* | 7/2003 | Ranta | ..................... H04W 84/18 455/450 |

(Continued)

OTHER PUBLICATIONS

PCT International Application No. PCT/KR2018/009511, Written Opinion of the International Searching Authority dated Dec. 13, 2018, 20 pages.
(Continued)

*Primary Examiner* — Mark G. Pannell
(74) *Attorney, Agent, or Firm* — Lee Hong Degerman Kang Waimey

(57) ABSTRACT

The present invention pertains to a wireless communication system. More specifically, a signal transmission and reception method is proposed, wherein the method for a relay terminal transmitting and receiving a signal in a device to device (D2D) wireless communication system comprises receiving a disaster information message from a base station, and transmitting the disaster information message to one or more remote terminals if a message including the same disaster information as the disaster information message has not been received already.

18 Claims, 10 Drawing Sheets

(51) Int. Cl.
*H04W 4/70* (2018.01)
*H04W 76/30* (2018.01)
*H04W 4/90* (2018.01)
*H04W 4/40* (2018.01)
*H04L 5/00* (2006.01)

(58) Field of Classification Search
USPC .......................................................... 370/329
See application file for complete search history.

(56) References Cited

U.S. PATENT DOCUMENTS

| | | | |
|---|---|---|---|
| 2004/0033784 A1* | 2/2004 | Kojima | H04B 7/15542 455/73 |
| 2007/0053343 A1* | 3/2007 | Suotula | H04M 7/1285 370/352 |
| 2007/0115884 A1* | 5/2007 | Shang | H04W 36/0083 370/331 |
| 2008/0046554 A1 | 2/2008 | Datta et al. | |
| 2013/0237148 A1* | 9/2013 | McCann | H04W 4/80 455/41.1 |
| 2014/0153390 A1* | 6/2014 | Ishii | H04L 47/12 370/230 |
| 2014/0269704 A1 | 9/2014 | Alexander et al. | |
| 2015/0117300 A1* | 4/2015 | Nam | H04L 1/1887 370/315 |
| 2015/0215757 A1 | 7/2015 | Miskiewicz et al. | |
| 2015/0372774 A1* | 12/2015 | Samuelsson | H04H 20/72 455/3.01 |
| 2016/0150426 A1* | 5/2016 | Panaitopol | H04L 67/104 370/252 |
| 2016/0227463 A1* | 8/2016 | Baligh | H04W 40/16 |
| 2017/0013576 A1* | 1/2017 | Jung | H04W 76/11 |
| 2017/0214607 A1* | 7/2017 | Kim | H04W 28/04 |
| 2018/0324571 A1* | 11/2018 | Buckley | H04W 12/10 |
| 2020/0037218 A1* | 1/2020 | Karampatsis | H04W 36/16 |
| 2020/0228951 A1* | 7/2020 | Chun | H04W 76/30 |
| 2021/0127396 A1* | 4/2021 | Su | H04L 5/0012 |

OTHER PUBLICATIONS

Synctechno, "Potential requirements in the section 5.2.6", 3GPP TSG-SA WG1 Meeting #78, S1-172061, May 2017, 2 pages.
China Unicom, "Updates to Definitions in TS 22.261", 3GPP TSG-SA WG1 Meeting #78, S1-172248, May 2017, 4 pages.

* cited by examiner (a)Control-Plane Protocol Stack (b)User-Plane Protocol Stack

METHOD AND APPARATUS FOR RELAY TERMINAL TRANSMITTING AND RECEIVING SIGNAL IN D2D WIRELESS COMMUNICATION SYSTEM

CROSS-REFERENCE TO RELATED APPLICATIONS

This application is the National Stage filing under 35 U.S.C. 371 of International Application No. PCT/KR2018/009511, filed on Aug. 20, 2018, which claims the benefit of U.S. Provisional Application No. 62/547,114, filed on Aug. 18, 2017, the contents of which are all hereby incorporated by reference herein in their entirety.

TECHNICAL FIELD

The present disclosure relates to a wireless communication system, and more particularly, to a method and apparatus for device-to-device (D2D) communication.

BACKGROUND ART

As an example of a mobile communication system to which the present disclosure is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, standard institutes such as 3GPP or IEEE have proceeded to establish a D2D communication standard on the basis of LTE-A or Wi-Fi, and Qualcomm has developed their own D2D communication technology.

It is expected that D2D communication contributes to increase throughput of a mobile communication system and create new communication services. Also, D2D communication may support proximity based social network services or network game services. The problem of link of a user equipment located at a shade zone may be solved by using a D2D link as a relay. In this way, it is expected that the D2D technology will provide new services in various fields.

D2D communication technologies such as infrared communication, ZigBee, radio frequency identification (RFID) and near field communications (NFC) based on RFID have been already used. However, since these technologies support communication only of a specific object within a limited distance (about 1 m), it is difficult for the technologies to be strictly regarded as D2D communication technologies.

Although D2D communication has been described as above, details of a method for transmitting data from a plurality of D2D user equipments with the same resource have not been suggested.

DISCLOSURE

Technical Problem

The object of the present disclosure is to provide a method of efficiently transmitting and receiving a disaster information message between relay and remote UEs in a D2D communication system and apparatus for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for signal reception in a wireless communication system.

In an aspect of the present disclosure, provided is a method of transmitting and receiving a signal by a relay user equipment (UE) in a device-to-device (D2D) wireless communication system. The method may include: receiving a disaster information message from a base station; and when a message including the same disaster information as the disaster information message has not been received, transmitting the disaster information message to at least one remote UE.

Additionally, even when the message including the same disaster information as the disaster information message has been received, the method may include transmitting the disaster information message to a remote UE having no record of transmission of the disaster information message stored in the relay UE among the at least one remote UE.

Additionally, even when the message including the same disaster information as the disaster information message has been received, the method may further include transmitting the disaster information message to a remote UE which has not transmitted acknowledgement information for the disaster information message among the at least one remote UE.

Additionally, the at least one remote UE may be a remote UE which has transmitted a request message for the disaster information message to the relay UE.

Additionally, the method may further include transmitting, to the at least one remote UE, a message for instructing to receive the disaster information message directly from the base station.

Additionally, the method may further include transmitting, to the at least one remote UE, a message for instructing to resume D2D communication upon completion of the direct reception of the disaster information message from the base station.

Additionally, the method may further include: receiving a connection release message for the at least one remote UE from the base station; and releasing a connection with the at least one remote UE.

In another aspect of the present disclosure, provided is a user equipment (UE) for transmitting and receiving a signal in a device-to-device (D2D) wireless communication system. The UE may include: a transmitter; a receiver; and a processor. The processor may be configured to control the receiver to receive a disaster information message from a base station and, when a message including the same disaster information as the disaster information message has not been received, control the transmitter to transmit the disaster information message to at least one remote UE.

Additionally, even when the message including the same disaster information as the disaster information message has been received, the processor may be configured to control the transmitter to transmit the disaster information message to a remote UE having no record of transmission of the disaster information message stored in the relay UE among the at least one remote UE.

Additionally, even when the message including the same disaster information as the disaster information message has been received, the processor may be further configured to control the transmitter to transmit the disaster information message to a remote UE which has not transmitted an acknowledgement information for the disaster information message among the at least one remote UE.

Additionally, the at least one remote UE may be a remote UE which has transmitted a request message for the disaster information message to the relay UE.

Additionally, the processor may be further configured to control the transmitter to transmit, to the at least one remote UE, a message for instructing to receive the disaster information message directly from the base station.

Additionally, the processor may be further configured to control the transmitter to transmit, to the at least one remote UE, a message for instructing to resume D2D communication upon completion of the direct reception of the disaster information message from the base station.

Additionally, wherein the processor may be further configured to control the receiver to receive a connection release message for the at least one remote UE from the base station and release a connection with the at least one remote UE.

It is to be understood that both the foregoing general description and the following detailed description of the present disclosure are exemplary and intended to provide further explanation of the disclosure as claimed.

Advantageous Effects

According to embodiments of the present disclosure, a network may efficiently transmit a disaster information message to relay and remote UEs using system resources.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present disclosure will be readily understood from the embodiments of the present disclosure, examples of which are illustrated in the accompanying drawings. Embodiments described later are examples in which technical features of the present disclosure are applied to a 3GPP system.

Although the embodiments of the present disclosure are described in the context of a long term evolution (LTE) system and a LTE-advanced (LTE-A) system in the present specification, they are purely exemplary. Therefore, the embodiments of the present disclosure are applicable to any other communication system corresponding to the above definition. An exemplary system in which the disclosure disclosed herein may be implemented is a system compliant with the 3GPP specification TS 36.321 Version 12.6.0. In addition, although the embodiments of the present disclosure are described based on a frequency division duplex (FDD) scheme in the present specification, the embodiments of the present disclosure may be easily modified and applied to a half-duplex FDD (H-FDD) scheme or a time division duplex (TDD) scheme.

Figure 1:
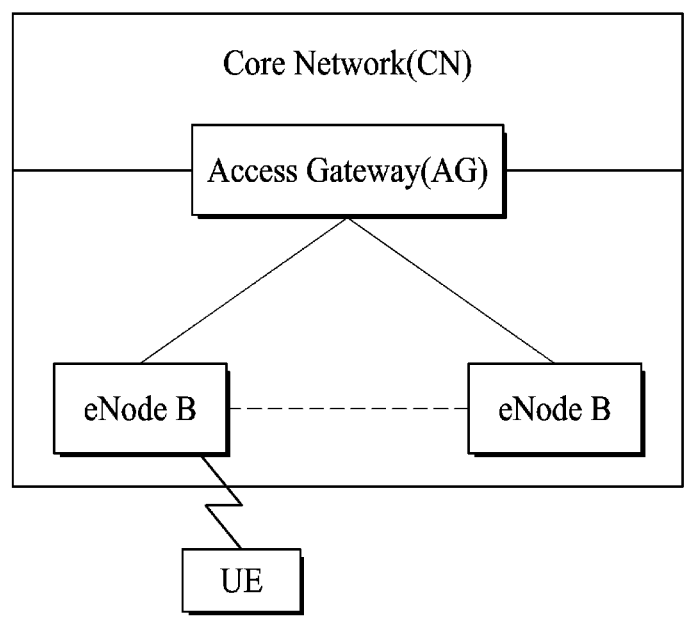
FIG. 1 is a diagram showing a network structure of an Evolved Universal Mobile Telecommunications System (E-UMTS) as an example of a wireless communication system.
Figure 2:
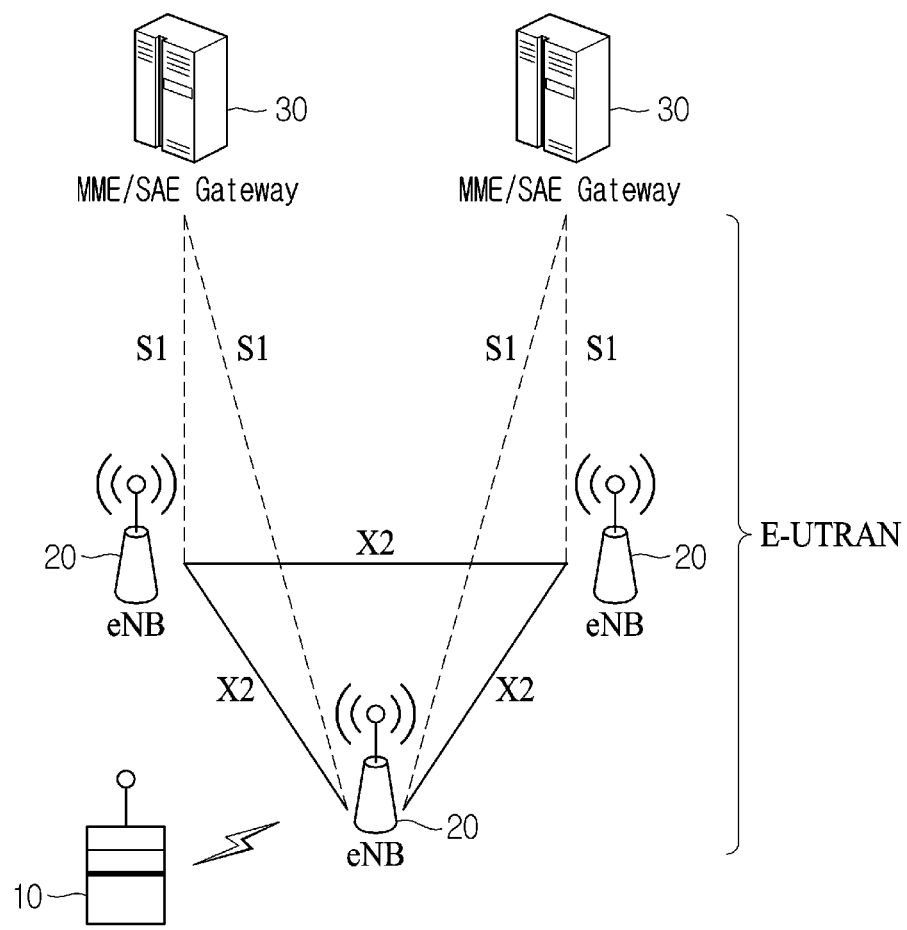
FIG. 2 is a block diagram illustrating network structure of an evolved universal mobile telecommunication system (E-UMTS)

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 3:
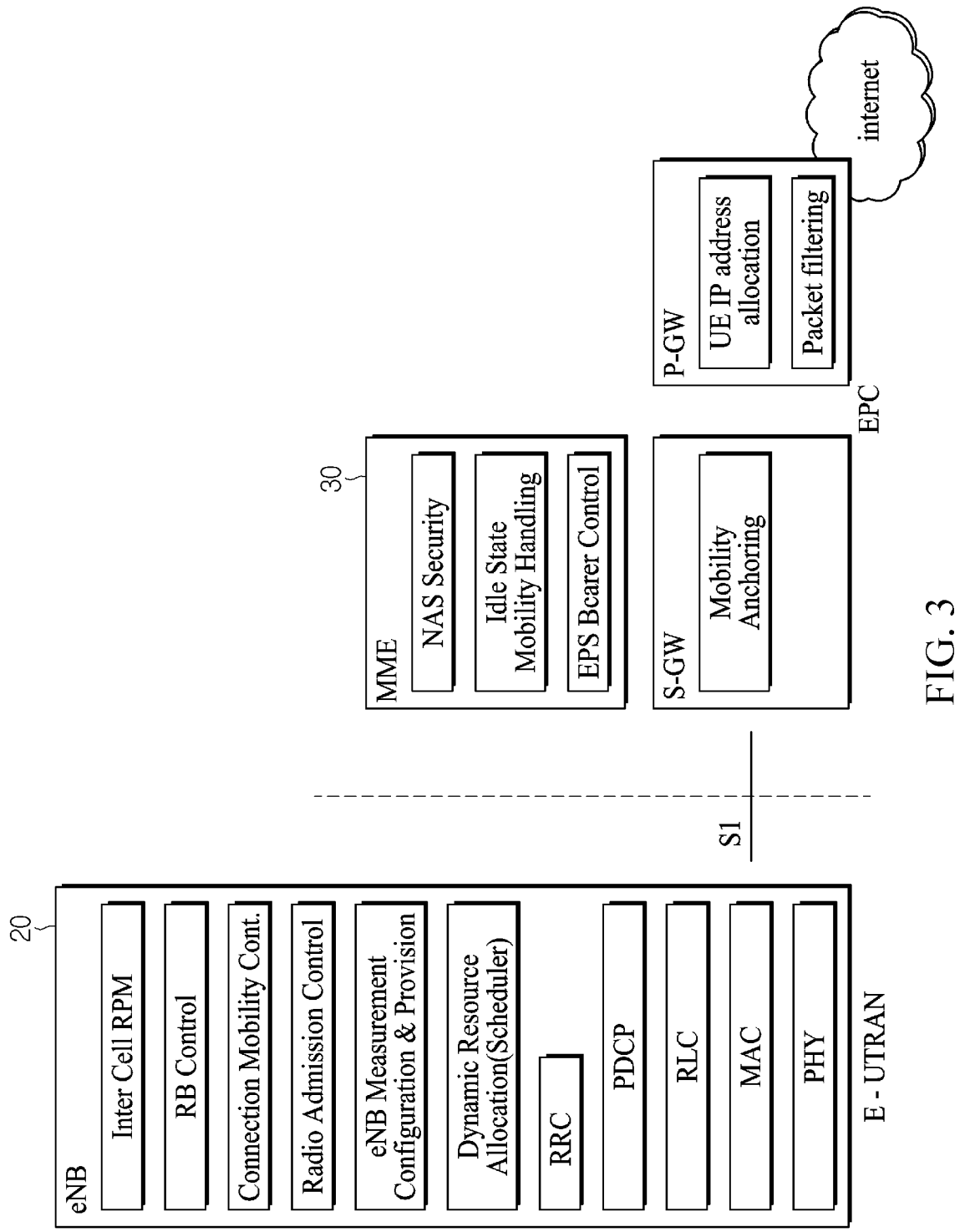
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
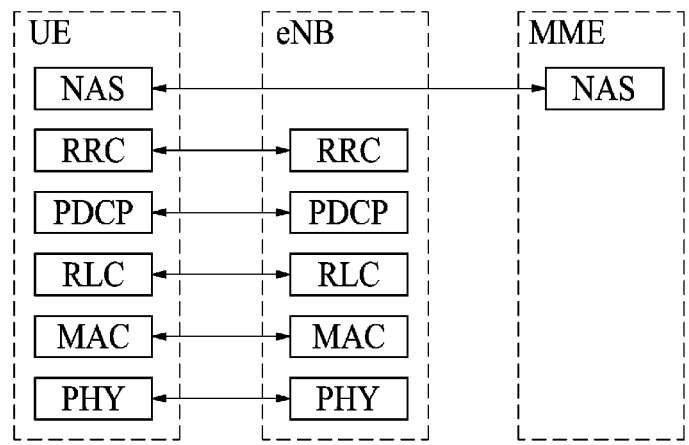
FIG. 4 is a diagram showing a control plane and a user plane of a radio interface protocol between a UE and an E-UTRAN based on a 3rd generation partnership project (3GPP) radio access network standard.
Figure 4:
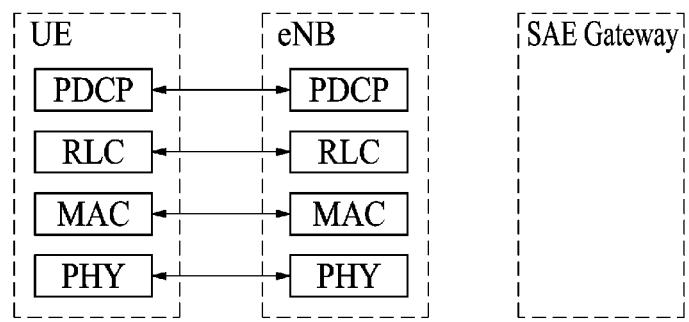

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA)

scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
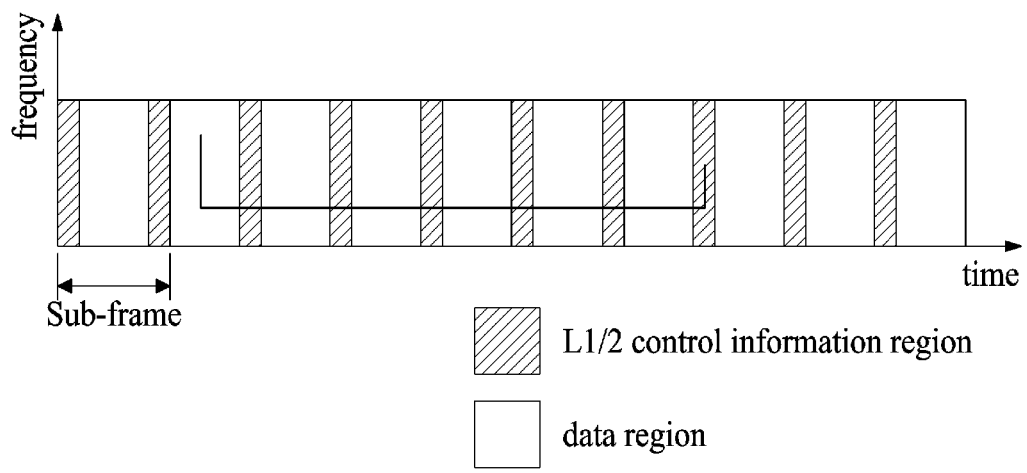
FIG. 5 is a diagram of an example physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 6:
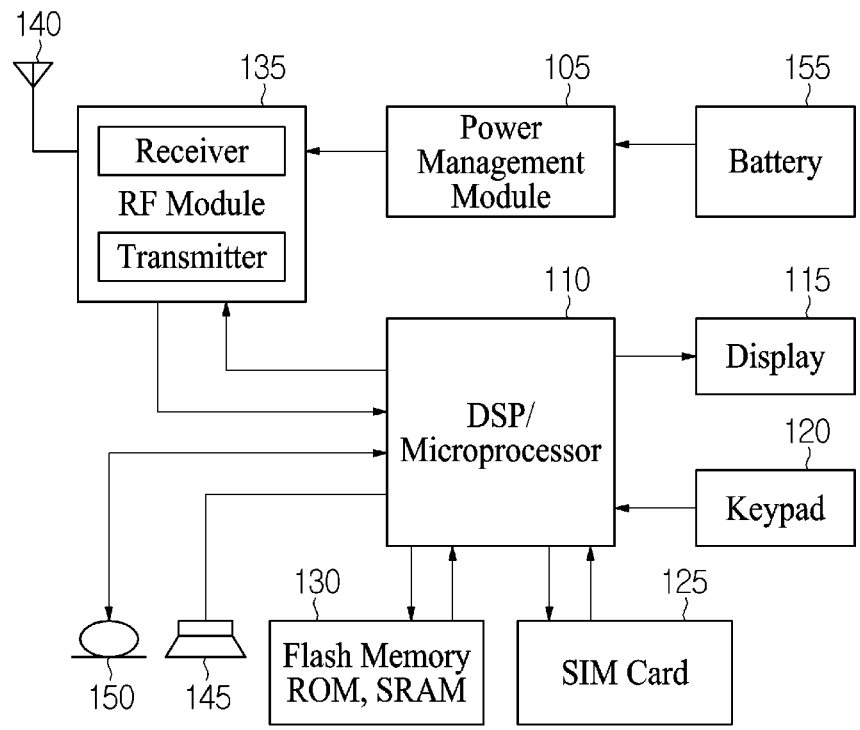
FIG. 6 is a block diagram of a communication apparatus according to an embodiment of the present disclosure.

FIG. 6 is a block diagram of a communication apparatus according to an embodiment of the present disclosure.

The apparatus shown in FIG. 6 can be a user equipment (UE) and/or eNB adapted to perform the above mechanism, but it can be any apparatus for performing the same operation.

As shown in FIG. 6, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals).

Figure 7:
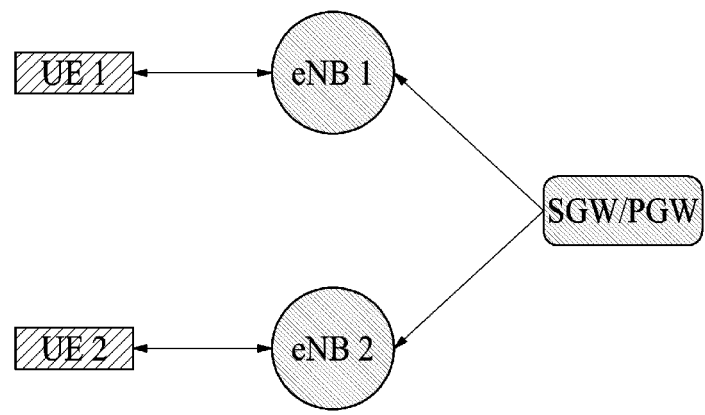
FIG. 7 is an example of default data path for a normal communication.

FIG. 7 is an example of default data path for communication between two UEs. With reference to FIG. 7, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 8:
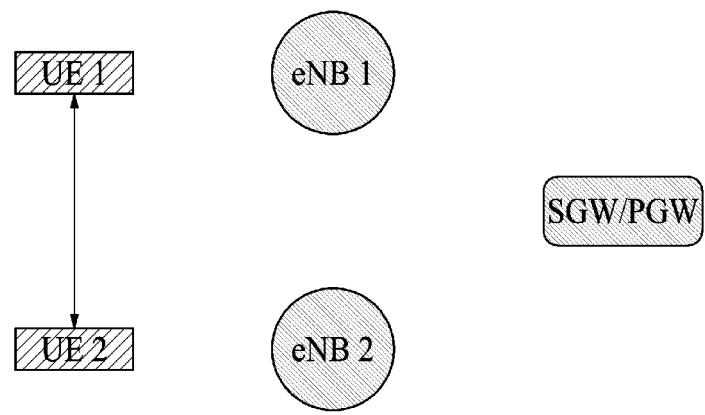
FIGS. 8 and 9 are examples of data path scenarios for a proximity communication.
Figure 9:
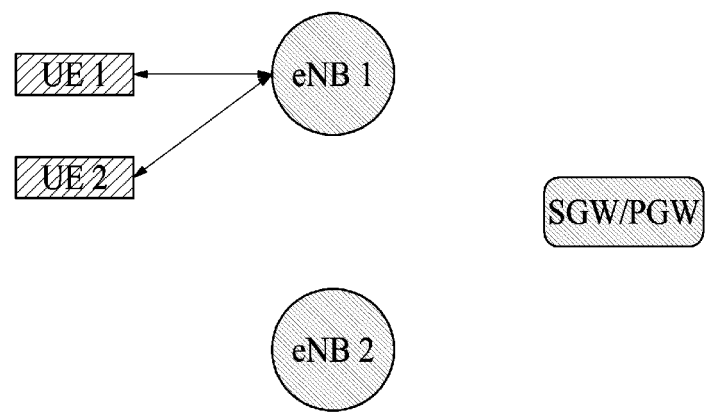

FIGS. 8 and 9 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected to each other through eNB only.

Figure 10:
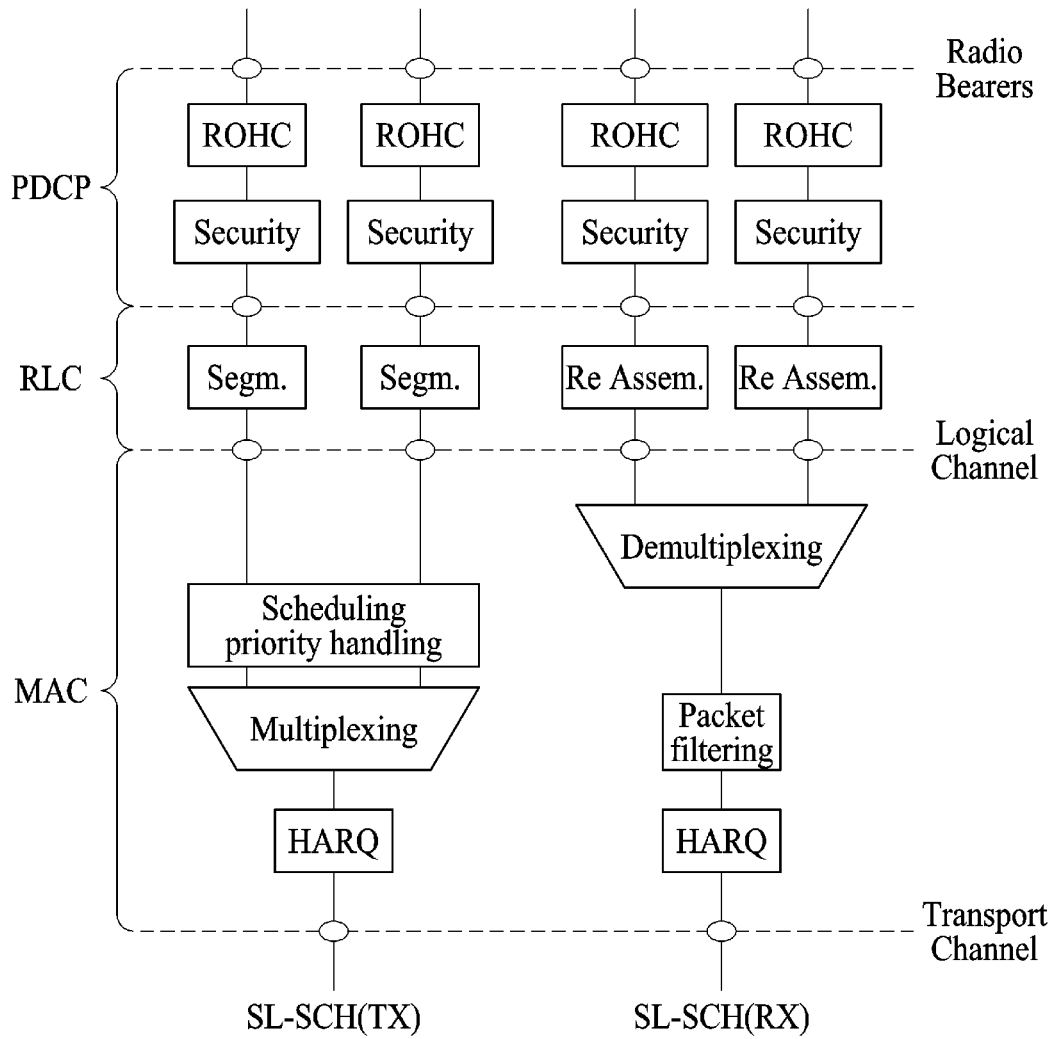
FIG. 10 is a conceptual diagram illustrating for a Layer 2 Structure for Sidelink.

FIG. 10 is a conceptual diagram illustrating for a Layer 2 structure for Sidelink.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The sidelink Control period is the period over which resources allocated in a cell for sidelink control information and sidelink data transmissions occur. Within the sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order:
Uu transmission/reception (highest priority);
PC5 sidelink communication transmission/reception;
PC5 sidelink discovery announcement/monitoring (lowest priority).

The UE may not establish and maintain a logical connection to receiving UEs before one-to-many sidelink communication. The higher layer may establish and maintain a logical connection for one-to-one sidelink communication including ProSe UE-to-Network Relay operation.

Figure 11:
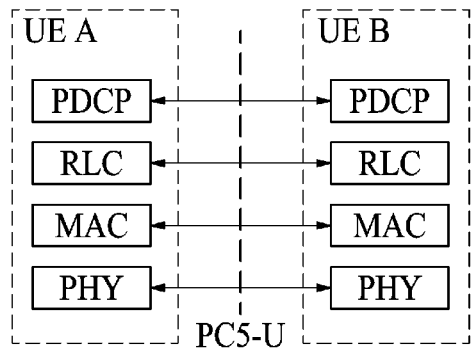
FIG. 11 is a conceptual diagram illustrating for User-Plane protocol stack for ProSe Direct Communication.

The Access Stratum protocol stack for an SBCCH in the PC5 interface consists of RRC, RLC, MAC and PHY as shown in FIG. 11.

Hereinafter, a public warning system (PWS) will be described.

The PWS includes the Earthquake and Tsunami Warning System (ETWS), which is a disaster alarm system of Europe/Japan, the Commercial Mobile Alert System (CMAS), which is a disaster alarm system of North America, the European Public Warning System (EU-Alert), and the Korean Public Alert System (KPAS). The PWS may refer to a warning message transmission method supported in the 3GPP system.

In TS 22.268, it is described how the PWS transmits to UEs warning notification messages about natural disasters such as earthquakes, tsunamis, hurricanes, etc.

The following items may be required for transmission of warning notification messages.
The PWS needs to be capable of broadcasting warning notifications to multiple users simultaneously with no acknowledgement required.
The PWS needs to be capable of supporting simultaneous broadcast of multiple warning notifications.
Warning notifications needs to be broadcast to a notification area which is based on geographical information specified by a warning notification provider.
PWS-enabled UEs (PWS-UEs) in idle mode need to be capable of receiving broadcast warning notifications.
The PWS needs to broadcast warning notifications only in languages as prescribed by regulatory requirements.
Warning notifications are processed by the PWS in a first-in first-out manner under regulatory requirements.
Reception and presentation of warning notifications to a user should not occupy an active voice or data session.
Warning notifications should be limited to emergencies where life or property is at imminent risk, and some responsive action should be taken.

These requirements do not prohibit the use of the operator's network (i.e. broadcast technology) implemented for warning notifications to be used for commercial services.

The PWS refers to a disaster notification system, and more particularly, to a system for quickly providing disaster information to UEs in the occurrence of a disaster such as earthquake, landslide, fire, etc. to allow the UE's owner to take appropriate evacuation actions based on the provided disaster information. In the PWS, an institution for generating PWS information transmits disaster information to each mobile service provider and network, and each mobile service provider and network forward the disaster information to each UE.

The current PWS has been implemented based on legacy UEs. The legacy UE supports voice calls regardless of whether it is a feature phone or a smartphone and includes a device configured to display information and a device configured to output sounds. Thus, upon receipt of disaster information in the occurrence of a disaster, each UE notifies its user of the disaster information by displaying the information on the display device or outputting a specific alarm.

However, in recent years, other types of UEs have been developed, which are different from the legacy UE. With advance in the Internet of Things (IoT) technology, IoT UEs such as smart watches, smart bands, etc. have been introduced. Since the IoT UE is in contact with the user's body, it may deliver warnings more effectively. For example, in the case of the smartphone, the user may fail to feel a vibration or listen to a sound, but in the case of the smart watch worn on the wrist, the user may hardly fail to miss a vibration. Accordingly, disaster messages may need to be provided to the IoT UE.

The battery is the greatest limitation of the IoT UE. Since the power of the IoT UE is limited, the IoT UE has a short signal propagation distance, compared to other UEs, for example, the smartphone. Accordingly, since the IoT UE has small power available towards the eNB, a relay UE may be used to assist the IoT UE to transmit a signal to the network.

Hereinafter, the definitions and details of the Prose, indirect mode, and relay in the EPS will be described.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a non-portable device such as a PC (Personal Computer) and vehicle-mounted device. In the present disclosure, a UE can be regarded as a UE capable of receiving an MCPTT (Mission Critical Push To Talk) service, i.e., MCPTT capable UE.

Proximity Services (or ProSe Service or Proximity based Service): A service that enables discovery between physically proximate devices, mutual direct communication through a base station, or communication through the third party device. Here, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe communication using a ProSe E-UTRA communication path.

ProSe-assisted WLAN Direct Communication: ProSe communication using a direct communication path.

ProSe Communication Path: A communication path supporting ProSe communication. The Prose E-UTRA communication path may be established between ProSe-enabled UEs using the E-UTRA or by a local eNB. The ProSe-assisted WLAN direct communication may be directly established between ProSe-enabled UEs using the WLAN.

EPC Path (or Infrastructure Data Path): A user plane communication path via the EPC.

ProSe Discovery: a process that identifies that a UE that is ProSe-enabled is in proximity of another, using E-UTRA.

ProSe Group Communication: one-to-many ProSe Communication, which uses a common communication path, between more than two ProSe-enabled UEs in proximity.

ProSe UE-to-Network Relay: ProSe-enabled Public Safety UE that acts as a communication relay between a ProSe-enabled UE and the ProSe-enabled network using E-UTRA. In the present disclosure, the Prose UE-to-network relay may be referred to as 'UE-to-network relay', 'UE-network relay', 'ProSe UE-network relay', or 'UE-to-network relay UE'.

Remote UE: This is a Prose-enabled UE connected to EPC network, i.e. perform communication with a PDN, through Prose UE-to-Network Relay without service from E-UTRAN.

ProSe UE-to-UE relay: a form of relay in which a ProSe-enabled UE acts as a ProSe Communication relay between two other ProSe-enabled UEs. In the present disclosure, the ProSe UE-to-UE relay may be referred to as 'UE-to-UE relay' 'UE-UE relay' 'ProSe UE-UE relay', or 'UE-to-UE relay UE'.

ProSe-enabled Network: a network that supports ProSe Discovery, ProSe Communication and/or ProSe-assisted WLAN direct communication. Hereinafter, the ProSe-enabled network may simply be referred to as a network.

ProSe-enabled UE: A UE that supports ProSe discovery, ProSe communication, and/or ProSe-assisted WLAN direct communication. Herein, the ProSe-enabled UE or ProSe-enabled public safety UE is simply referred to as the UE.

Model A: involves one UE announcing "I am here". This model defines two roles for the ProSe-enabled UEs that are participating in ProSe Direct Discovery.

> Announcing UE: The UE announces certain information that could be used by UEs in proximity that have permission to discover.

> Monitoring UE: The UE that monitors certain information of interest in proximity of announcing UEs.

Model B: involves one UE asking "who is there" and/or "are you there". This model defines two roles for the ProSe-enabled UEs that are participating in ProSe Direct Discovery.

> Discoverer UE: The UE transmits a request containing certain information about what it is interested to discover.

> Discoveree UE: The UE that receives the request message can respond with some information related to the discoverer's request.

Proximity: Proximity is determined when proximity criteria defined for discovery and communication are satisfied.

User Service Description (USD): in the USD (see 3GPP TS 26.346), the application/service layer provides for each service the TMGI (Temporary Mobile Group Identity), the session start and end time, the frequencies and the MBMS service area identities (MBMS SAIs, see definition in section 15.3 of 3GPP TS 23.003) belonging to the MBMS service area (see definition in 3GPP TS 23.246)

FIG. 7 shows default data paths used by two UEs for communication in the EPS. Such a default path passes through an eNB and a core network (i.e., EPC) managed by a service provider. In the present disclosure, this path is referred to as 'infrastructure data path (or EPC path)', and communication based on such an infrastructure data path is referred to as 'infrastructure communication'.

Figure 12:
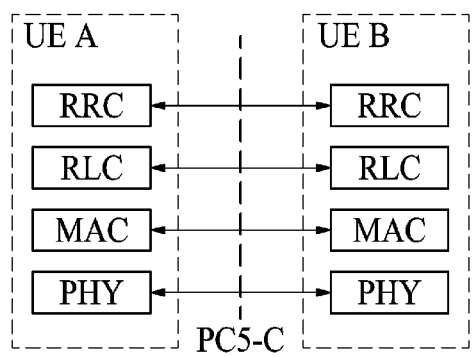
FIG. 12 is Control-Plane protocol stack for ProSe Direct Communication.

FIG. 11 is a conceptual diagram illustrating for User-Plane protocol stack for ProSe Direct Communication, and FIG. 12 is Control-Plane protocol stack for ProSe Direct Communication.

FIG. 11 shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11.

User plane details of ProSe Direct Communication: i) there is no HARQ feedback for sidelink communication, ii) RLC UM is used for sidelink communication, iii) RLC UM is used for sidelink communication, iv) a receiving RLC UM entity used for sidelink communication does not need to be configured prior to reception of the first RLC UMD PDU, and v) ROHC Unidirectional Mode is used for header compression in PDCP for sidelink communication.

A UE may establish multiple logical channels. LCID included within the MAC subheader uniquely identifies a logical channel within the scope of one Source Layer-2 ID and ProSe Layer-2 Group ID combination. Parameters for logical channel prioritization are not configured. The Access stratum (AS) is provided with the PPPP of protocol data unit transmitted over PC5 interface by higher layer. There is a PPPP associated with each logical channel.

SL-RNTI is a unique identification used for ProSe Direct Communication Scheduling.

The Source Layer-2 ID identifies the sender of the data in sidelink communication. The Source Layer-2 ID is 24 bits long and is used together with Destination Layer-2 ID and LCID for identification of the RLC UM entity and PDCP entity in the receiver.

The destination Layer-2 ID identifies the target of the data in sidelink communication. The Destination Layer-2 ID is 24 bits long and is split in the MAC layer into two bit strings: i) One bit string is the LSB part (8 bits) of Destination Layer-2 ID and forwarded to physical layer as Group Destination ID. This identifies the target of the intended data in sidelink control information and is used for filtering of packets at the physical layer. And ii) Second bit string is the MSB part (16 bits) of the Destination Layer-2 ID and is carried within the MAC header. This is used for filtering of packets at the MAC layer.

No Access Stratum signalling is required for group formation and to configure Source Layer-2 ID, Destination Layer-2 ID and Group Destination ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. In case of one-to-one communications, higher layer provides Source Layer-2 ID and Destination Layer-2 ID.

A UE does not establish and maintain a logical connection to receiving UEs prior to one-to-many a sidelink communication. Higher layer establish and maintain a logical connection for one-to-one sidelink communication including ProSe UE-to-Network Relay operation.

The Access Stratum protocol stack for SBCCH in the PC5 interface consists of RRC, RLC, MAC and PHY as shown below in FIG. 12.

Figure 13:
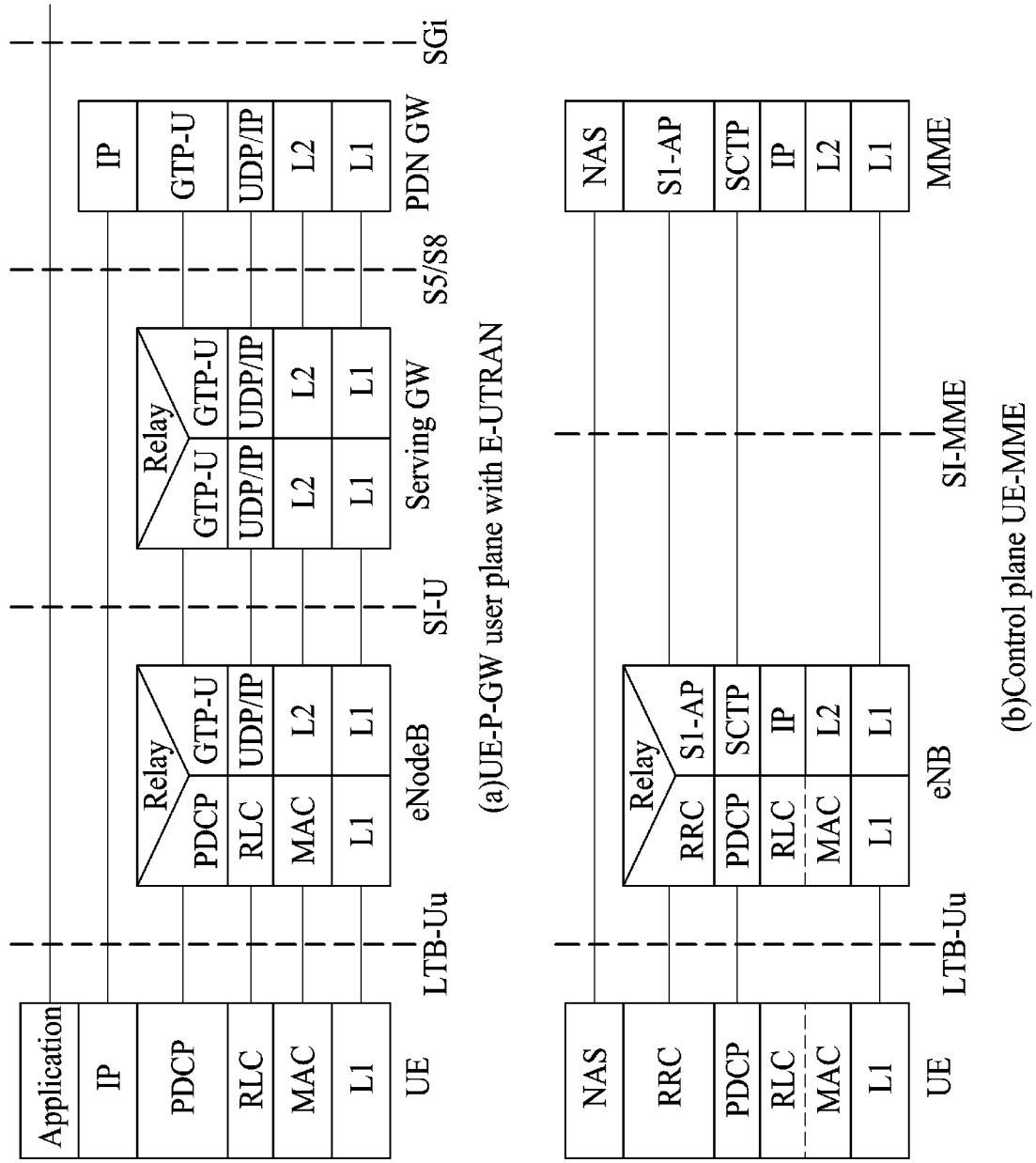
FIG. 13 is a diagram illustrating LTE (Long Term Evolution) protocol stacks for a user plane and a control plane.

FIG. 13 illustrates LTE protocol stacks for a user plane and a control plane. FIG. 11(a) illustrates user plane protocol stacks over UE-eNB-SGW-PGW-PDN and FIG. 115(b) illustrates control plane protocol stacks over UE-eNB-MME-SGW-PGW. Functions of key layers of the protocol stacks will now be briefly described below.

Referring to FIG. 13(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 13(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

The embodiments of the present disclosure may be supported by standard specifications disclosed for at least one of wireless access systems including the Institute of Electrical and Electronics Engineers (IEEE) 802.xx system, the 3GPP system, the 3GPP LTE system, the 3GPP 5G NR system, and the 3GPP2 system. In particular, the embodiments of the present disclosure may be supported by the following standard specifications: 3GPP TS 36.211, 3GPP TS 36.212, 3GPP TS 36.213, 3GPP TS 36.321, 3GPP TS 36.331, 3GPP TS 36,423, 3GPP TS 38.211, 3GPP TS 38.212, 3GPP TS 38.213, 3GPP TS 38.321, 3GPP TS 38.331, and 3GPP TS 38.423. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

In addition, the embodiments of the present disclosure may be supported by the definitions, architectural assumptions and requirements, and control and user plane stacks described in 3GGP TR 23.744.

The present disclosure proposes a method for a remote UE to efficiently receive disaster information. To this end, according to the present disclosure, when a relay UE receives disaster information from an eNB/network connected to the relay UE, the relay UE may determine whether there is a remote UE connected to the relay UE. If there is a remote UE connected to the relay UE, the relay UE may forward the received disaster information to the remote UE.

Since the disaster information should be transmitted to the UE accurately and rapidly, the disaster information may be repeatedly transmitted. That is, when the same message is transmitted multiple times, the UE may properly cope with a disaster without missing a part of the message. In the case of transmission from the eNB to the UE, a message from the eNB may be simultaneously transmitted to multiple UEs in the coverage of the eNB. However, depending on the location of each UE, a certain UE may successfully perform the reception, but another UE may fail in the reception. Thus, in this case, although the eNB transmits the same message multiple times, it may not be regarded as system waste. However, if the relay UE forwards all received messages to the remote UE to provide the disaster information to the remote UE, it may cause system resource waste. The reason for this is that there are signaling relations and contexts between the remote and relay UEs. Thus, the present disclosure proposes the following operations. Upon receiving a disaster information message from the network, the relay UE may determine whether the currently received disaster information message is equal to a previously received disaster information message. If the current disaster information message is different from the previous disaster information message, the relay UE may forward the disaster information message to the remote UE. If the current disaster information message is equal to the previous disaster information message, the relay UE may not forward the disaster information message to the remote UE.

In this case, the relay UE may be connected to multiple remote UEs. Thus, the relay UE may record which disaster information message the relay UE transmits to each of the connected remote UEs. Whenever receiving the disaster information message from the eNB, the relay UE may determine, based on the recorded information, whether the relay UE has transmitted a message containing the same information as the received disaster information message to each of the connected remote UEs. If the relay UE has not transmitted the message containing the same information as the received disaster information message before, the relay UE may transmit the received disaster information message to the remote UE.

For example, a CMAS message, which carries disaster information, may be transmitted in system information block 12 as shown in Tables 1 and 2 below.

TABLE 1

SystemInformationBlockType12 information element

```
- ASN1START
SystemInformationBlockType12-r9 ::= SEQUENCE {
    messageIdentifier-r9            BIT STRING (SIZE (16)),
    serialNumber-r9                 BIT STRING (SIZE (16)),
    warningMessageSegmentType-r9    ENUMERATED {notLastSegment,lastSegment},
    warningMessageSegmentNumber-r9  INTEGER (0..63),
    warningMessageSegment-r9        OCTET STRING,
    dataCodingScheme-r9             OCTET STRING (SIZE (1)) OPTIONAL, - CondSegment1
    lateNonCriticalExtension        OCTET STRING  OPTIONAL,
    ...
}
- ASN1STOP
```

TABLE 2

SystemInformationBlockType12 field descriptions dataCodingScheme
Identifies the alphabet/coding and the language applied variations of a CMAS notification. The octet (which is equivalent to the octet of the equivalentIE defined in TS 36.413 [39, 9.2.1.52]) contains the octet of the equivalentIE defined in TS 23.041 [37, 9.4.3.2.3] and encoded according to TS 23.038 [38].
messageIdentifier
Identifies the source and type of CMAS notification. The leading bit (which is equivalent to the leading bit of the equivalentIE defined in TS 36.413 [39, 9.2.1.44]) contains bit 7 of the first octet of toe equivalentIE, defined in and encoded according to TS 23.041 [37, 9.4.3.2.1], while the trailing bit contains bit 0 of second octet of the same equivalentIE.
serialNumber
Identifies variations of a CMAS notification. The leading bit (which is equivalent to the leading bit of the equivalentIE defined to TS 36.413 [39, 9.2.1.45]) contains bit 7 of the first octet of the equivalentIE, defined in and encoded according to TS 23.041 [37, 9.4.3.2.2], while the trailing bit contains bit 0 of second octet of the same equivalentIE.
warningMessageSegment
Carries a segment of the Warning Message ContentsIE defined in TS 36.413 [39]. The first octet of the Warning Message ContentsIE is equivalent to the first octet of the CB data IE defined in and encoded according to TS 23.041 [37, 9 4.2.2.5] and so on.
warningMessageSegmentNumber
Segment number of the CMAS warning message segment contained in the SIB. A segment number of zero corresponds to the first segment, one corresponds to the second segment, and so on.
warningMessageSegmentType TABLE 2-continued SystemInformationBlockType12 field descriptions Indicates whether the included CMAS warning message segment is the last segment or not.

Using the messageidentifier/serialnumber/warningmessagesegment information, the relay UE may know whether the disaster information message received from the eNB is equal to the previously received message. In addition, when transmitting the disaster information message to each remote UE, the relay UE may use the same information to record which message the relay transmits to each remote UE.

When transmitting the disaster information message to the remote UE, the relay UE may segment the message into message segments or transmit the entirety of the message by combining the message segments.

During the above process, the relay UE may record which message the relay transmits to the remote UE and avoid the same message from being retransmitted to the remote UE based thereon, thereby improving the transmission efficiency. However, due to the characteristics of a radio channel, the message transmitted from the relay UE may be lost in a certain radio section. Thus, it is proposed that the relay UE uses acknowledgement information from the remote UE in determining whether the relay UE transmits the disaster information message to the relay UE. In other words, it is proposed that upon receiving the disaster information message from the relay UE, the remote UE transmits, to the relay UE, information indicating that the remote UE receives the disaster information message. When receiving the disaster information message from the eNB, the relay UE may check the serial number of the message and determine whether the relay UE has received the message before using the serial number. When it is determined that the relay UE has received the message, the relay UE checks whether the relay UE has transmitted the corresponding message to the remote UE. When it is determined that the relay UE has transmitted the message to the remote UE, the relay UE checks whether the relay UE has received an acknowledgement for the message from the remote UE. When it is determined that the relay UE has received the acknowledgement for the message from the remote UE, the relay does not transmit the corresponding message to the remote UE. Otherwise, the relay UE transmits the message received from the eNB to the remote UE.

Most of the IoT UEs are low cost devices, and thus, display and audio devices may not be installed therein. That is, if the relay UE always transmits disaster information to the remote UE, it may cause radio resource waste since the IoT UE may not process the disaster information correctly. In addition, when the relay and remote UEs belong to the same user, the remote UE may inform the relay UE that the remote UE does not need to receive PWS information during the above-described process.

Thus, the present disclosure proposes that when the relay UE transmits the disaster information message received from the eNB to the remote UE, the relay UE transmits the disaster information message only to remote UEs that request PWS-related information and does not transmit the disaster information message to other UEs. Preferably, if the remote UE desires to receive the disaster information message, the remote UE may inform the relay UE that the remote UE requires the disaster information message when accessing the relay UE.

In mobile communication systems, each eNB manages radio resources in its coverage. Each eNB manages and allocates downlink and uplink radio resources for each UE. The management and allocation of the downlink and uplink radio resources may include management of radio resources used by the relay UE and radio resources used between the relay and remote UEs. The radio resources between the relay and remote UEs may be equal to radio resources used by the relay UE to perform transmission to the eNB, i.e., uplink radio resources. Thus, the eNB needs to efficiently manage the uplink radio resources by dividing the uplink radio resources into radio resources to be used by the relay UE and eNB and radio resources to be used by the relay and remote UEs.

However, in the occurrence of a disaster, most people in the corresponding area attempt to make calls to their friends or emergency centers using their UEs, and thus, the uplink radio resources may become insufficient. In this case, the insufficiency of the uplink radio resources may decrease the radio resources to be used by the relay and remote UEs. Thus, even when the relay UE successfully receives the disaster information message from the eNB, the relay UE may not forward the message to the remote UE due to the lack of the radio resources.

Accordingly, the present disclosure proposes that the relay UE instructs the remote UE to directly receive system information, broadcast information, or the disaster information message from the eNB.

When the remote UE connected to the relay UE receives specific information from the relay UE, the remote UE may disconnect the connection with the relay UE, transition from indirect mode to direct mode, and directly receive the system information or disaster information message.

To this end, the relay UE may instruct the remote UE to disconnect the connection with the relay UE and receive information directly from the eNB. Alternatively, the following method may be used for the instruction, i.e., the direct reception of the disaster information message.

When the relay UE is notified that the disaster information message will be transmitted from the eNB or receives the disaster information message from the eNB, the relay UE may perform one of the following operations.

The relay UE transmits a MAC control element designated as a specific LCID to the remote UE.

The relay UE transmits a MAC PDU including a specific Prose ID to the remote UE.

A specific value is transmitted on a physical channel. For example, the relay UE transmits a specific RNTI to the remote UE.

The relay UE transmits a signal designated as a specific physical channel to the remote UE.

The specific value/channel/message may indicate reception of disaster information.

When the remote UE receives the aforementioned value/channel/message while being connected to the relay UE or operating in the indirect mode, the remote UE may operate as follows.

The remote UE disconnects the connection with the relay UE, terminates the indirect mode, and transitions to the direct mode.

The remote UE attempts to access the eNB.

The remote UE attempts to receive at least one of the system information, broadcast information, and disaster information message from the eNB.

The relay UE may transmit information to the remote UE if the following additional conditions are satisfied.

A case in which the eNB instructs the relay UE to disconnect the connection with the remote UE.

A case in which when the relay UE requests the eNB to allocate radio resources to transmit information to the remote UE, the relay UE fails to receive the radio resources within a predetermined time, or the eNB rejects the request from the relay UE or informs the relay UE that the eNB is incapable of allocating the radio resources. Information about the predetermined time may be indicated when the eNB and relay UE establish an RRC connection.

As another method, when there are multiple relay UEs in the coverage of one eNB and each relay UE is connected to many remote UEs, it is difficult for the eNB to transmit signaling messages separately to UEs due to the limited amount of radio resources. Therefore, in this case, the eNB may need to control RRC or indirect connections of many UEs in the eNB coverage, and more particularly, disconnect the indirect connections for efficient use of the resources.

To this end, the eNB may instruct the relay UE to stop providing a connection service to the remote UE using system information or a paging message. For example, when the eNB transmits the disaster information message in an SIB, the eNB may additionally include information indicating whether the relay UE should release the connection with the remote UE or forward the disaster information message to the remote UE. The relay UE operates based on the information. As described above, in the occurrence of a disaster, it is important to use uplink/downlink radio resources efficiently. If the eNB operates as described above, the eNB may simultaneously release the connections to the relay and remote UEs while minimizing the amount of signaling. In this case, each of the relay and remote UEs may drop or minimize signaling the release of the indirection mode or transmission therebetween.

Alternatively, instead of instructing the relay and remote UEs to release the indirect mode, the eNB may instruct to stop the indirect mode temporarily and receive SIB/broadcast information/disaster information In this case, the remote UE stops the communication with the relay UE temporarily and receive the SIB or disaster information directly from the eNB. When completing the reception of the disaster information, the remote UE may resume the indirect mode.

Alternatively, the eNB broadcasts the disaster information or SIB within its coverage. When the relay UE receives the corresponding information, the relay UE may inform the remote UE connected to the relay UE of the presence/update of the disaster information. Based thereon, each remote UE attempts to receive the disaster information directly from the eNB.

The embodiments of the present disclosure described hereinbelow are combinations of elements and features of the present disclosure. The elements or features may be considered selective unless otherwise mentioned.

Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

In the embodiments of the present disclosure, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present disclosure may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present disclosure may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present disclosure may be carried out in other specific ways than those set forth herein without departing from the scope of the present disclosure. The above embodiments are therefore to be construed in all aspects as illustrative and not restrictive. The scope of the disclosure should be determined by the appended claims, not by the above description, and all changes coming within the meaning of the appended claims are intended to be embraced therein.

INDUSTRIAL APPLICABILITY

The embodiments of the present disclosure are applicable to various wireless access systems, for example, the 3GPP system, the 3GPP 5G NR system, and the 3GPP2 system. The embodiments of the present disclosure are applicable not only to the various wireless access systems but also to all application fields of the wireless communication systems.

The invention claimed is:

1. A method performed by a relay user equipment (UE) in a device-to-device (D2D) wireless communication system, the method comprising:
receiving system information related to a sidelink communication;
establishing a connection for a sidelink relay communication with at least one remote UE;
receiving, from a base station, information related to a warning message;
transmitting, to the at least one remote UE, a first message for instructing to receive the warning message directly from the base station; and
transmitting, to the at least one remote UE, a second message for instructing to resume sidelink relay communication upon completion of a reception of the warning message from the base station.

2. The method of claim 1, further comprising:
receiving, from the base station, a connection release message for the at least one remote UE; and
releasing a connection with the at least one remote UE.

3. The method of claim 1, wherein the relay UE is capable of communicating with at least one of another UE, a UE related to an autonomous driving vehicle, a base station and/or a network.

4. The method of claim 1, wherein the information related to the warning message includes the warning message.

5. The method of claim 1, wherein the information related to the warning message indicating to forward the waring message, to release the connection, or to temporarily stop the sidelink relay communication.

6. The method of claim 1, further comprising:
based on that the information related to the warning message indicates to forward the waring message and a message including same disaster information as the warning message has not been received, transmitting the warning message to the at least one remote UE.

7. The method of claim 6, further comprising:
based on that the message including same disaster information as the warning message has been received, transmitting the warning message to a remote UE having no record of transmission of the warning message.

8. The method of claim 6, further comprising:
based on that the message including same disaster information as the warning message has been received, transmitting the warning message to a remote UE which has not transmitted an acknowledgement message for the message including the disaster information.

9. The method of claim 6, wherein the at least one remote UE is a remote UE which has transmitted a request message for the warning message to the relay UE.

10. A user equipment (UE) in a wireless communication system, the UE comprising:
a transceiver; and
a processor coupled to the transceiver and configured to:
receive system information related to a sidelink communication;
establish a connection for a sidelink relay communication with at least one remote UE;
receive, from a base station, information related to a warning message; and
transmit, to the at least one remote UE, a first message for instructing to receive the warning message directly from the base station; and
transmit, to the at least one remote UE, a second message for instructing to resume sidelink relay communication upon completion of a reception of the warning message from the base station.

11. The UE of claim 10, wherein the processor is further configured to:
- receive a connection release message for the at least one remote UE from the base station; and
- release a connection with the at least one remote UE.

12. The UE of claim 10, wherein the UE is capable of communicating with at least one of another UE, a UE related to an autonomous driving vehicle, a base station and/or a network.

13. The UE of claim 10, wherein the information related to the warning message includes the warning message.

14. The UE of claim 10, wherein the information related to the warning message indicating to forward the waring message, to release the connection, or to temporarily stop the sidelink relay communication.

15. The UE of claim 10, further comprising:
- based on that the information related to the warning message indicates to forward the waring message and a message including same disaster information as the warning message has not been received, transmitting the warning message to the at least one remote UE.

16. The UE of claim 15, wherein, based on that the message including same disaster information as the warning message has been received, the processor is further configured to control the transmitter to transmit the warning message to a remote UE having no record of transmission of the warning message.

17. The UE of claim 15, wherein, based on that the message including same disaster information as the warning message has been received, the processor is further configured to control the transmitter to transmit the warning message to a remote UE which has not transmitted an acknowledgement message for the message including the disaster information.

18. The UE of claim 15, wherein the at least one remote UE is a remote UE which has transmitted a request message for the warning message to the relay UE.

* * * * *